Patented July 31, 1928.

1,679,000

UNITED STATES PATENT OFFICE.

CLAYTON OLIN NORTH, OF TALLMADGE TOWNSHIP, SUMMIT COUNTY, OHIO, ASSIGNOR TO THE RUBBER SERVICE LABORATORIES CO., OF AKRON, OHIO, A CORPORATION OF OHIO.

RUBBER SOFTENING AND COMPOUNDING INGREDIENT.

No Drawing. Application filed October 2, 1924. Serial No. 741,278.

The object of my present invention is the preparation of a composition of matter, suitable for incorporation into an unvulcanized rubber mix as a softening material. My invention is particularly directed to the preparation of a composition which may advantageously be added to rubber stocks, such as so-called mechanical goods or other rubber compositions which frequently contain large quantities of inert filling ingredients, comparatively, in proportion to the amount of rubber taken, to aid in the process of plasticizing the composition on the rubber mills, and to impart certain desirable softening qualities to the product after its vulcanization. My new composition may also be used in addition to or in place of a portion of the filling agents ordinarily used in such a rubber compound. Furthermore, by employing my new composition as a softening agent, larger quantities of inert filling materials may be incorporated into a given rubber mix than would be possible if a softening material were not added.

The unvulcanized rubber mix referred to above may comprise any of the compositions well known in the art of rubber compounding, and frequently consists of some variety or rubber which has been compounded with various fillers or compounding ingredients such as china clay, barytes, asbestos, talc, infusorial earth, and similar materials, as well as fillers of higher quality, such as zinc oxide, carbon black, lithopone, antimony sulfid and the like. Inasmuch as these fillers are frequently used in such quantity that a relatively large volume of the mix is composed of inert ingredients, it sometimes happens that the mix becomes so hard and stiff as to be workable with difficulty on the mill. To overcome this, a so-called "softener" is frequently added to a mix to aid in the process of breaking down or plasticizing the rubber on the mills, and to assist in the preparation of a homogeneous composition. Inasmuch as a softening agent does not ordinarily undergo any change in composition during the vulcanization process, it is essential to select, as such a material, one which shall not impart any undesirable properties to the final vulcanized rubber product. It is then apparent that a softening agent must possess and impart only such qualities as are desired in the vulcanized rubber product.

Heretofore various mineral oil products, such as kerosene and asphalt have been used as softeners, but their use has not been very satisfactory, and it has not been possible to use them at all as filling ingredients in quantities greater than were necessary for their use as softeners. I have now found that a mineral lubricating oil, having a viscosity of approximately 100 to 120 seconds Saybolt at 100° F., when blended in certain proportions with not more than 20% of a vegetable oil, and used in the manner and quantities as hereinafter disclosed, may advantageously be used as a softening agent, and to a certain extent as a filling ingredient in an unvulcanized rubber composition.

An oil which may be most advantageously used in the preparation of my blended product, is a so-called light lubricating or engine oil. One sample of such an oil possesses a gravity of 27.8° Bé., a flash of 345° F., a fire point of 395° F., a viscosity at 100° F. of 107 seconds (Saybolt), a viscosity at 212° F., of 40 seconds (Saybolt) a pour test of 30° F., and no organic acidity. When 1000 gallons of such an oil are blended with not more than 450 pounds of a vegetable oil, for example, winter pressed cotton seed oil, a product is obtained which can be used in a rubber composition both as a softener and as a filler. Ordinarily, approximately two parts of such a blended product to every 100 parts or rubber employed in a rubber composition, are sufficient to obtain the proper softening action necessary for producing a stock that can be readily used for friction coating a fabric. Where relatively hard rubber compositions must be employed, it is desirable to use as much as 5% of the blended oil as softener. In case the blended oil mixture is used as a filler in addition to its use as a softener, especially in the preparation of a friction stock, it is possible to add as much as 12% by weight of the blended oil composition to the unvulcanized mix. It has been found that a rubber stock containing such a blended oil, after vulcanization, ages much better than does a similar stock softened with mineral oil alone, and that the vulcanized rubber compound possesses highly desirable properties which were imparted to it by the softening action of the blended oil.

I have found that the most favorable proportions in which the oils should be mixed for producing a blended product possessing the desired qualities, are from 2½ to 20 parts by weight of the vegetable oil to 97.5 to 80 parts by weight of the mineral oil. The use of such a blended oil will soften a rubber stock so that it may be easily worked in the factory, and will help the stock to age properly after vulcanization.

What I claim is:—

1. A composition of matter for use as a softening and filling ingredient in the manufacture of a vulcanized rubber product, said composition comprising a mixture of from 80 to 97.5 parts of a mineral lubricating oil having a viscosity of not over 120 seconds Saybolt at 100° F., and from 20 to 2.5 parts of a vegetable oil.

2. A composition of matter for use as a softening and filling ingredient in the manufacture of a vulcanized rubber product, said composition comprising a mixture of not more than 97.5 parts of a mineral lubricating oil, and not more than 20 parts of a vegetable oil.

3. A composition of matter for use as a softening and filling ingredient in the manufacture of a vulcanized rubber product, said composition comprising a mixture of 1000 gallons of a mineral lubricating oil having a viscosity of not over 120 seconds Saybolt at 100° F., and not more than 450 pounds of cotton seed oil.

In testimony whereof I affix my signature.

CLAYTON OLIN NORTH.